No. 742,168. PATENTED OCT. 27, 1903.
C. CONSTINE.
COFFEE ROASTER.
APPLICATION FILED JUNE 13, 1903.
NO MODEL.
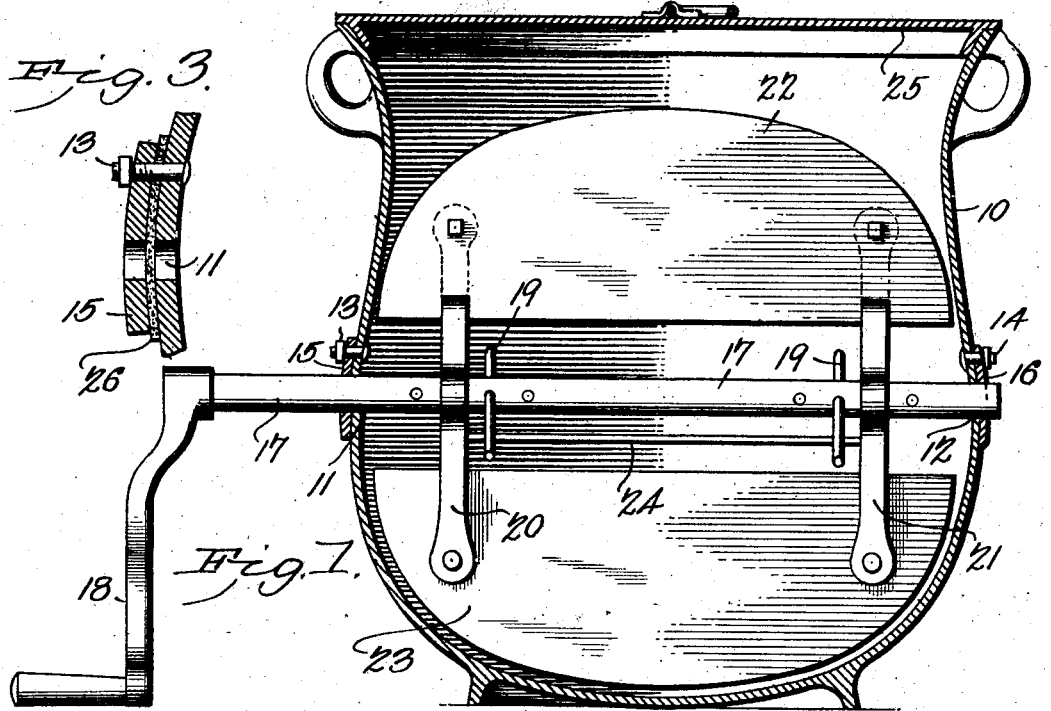
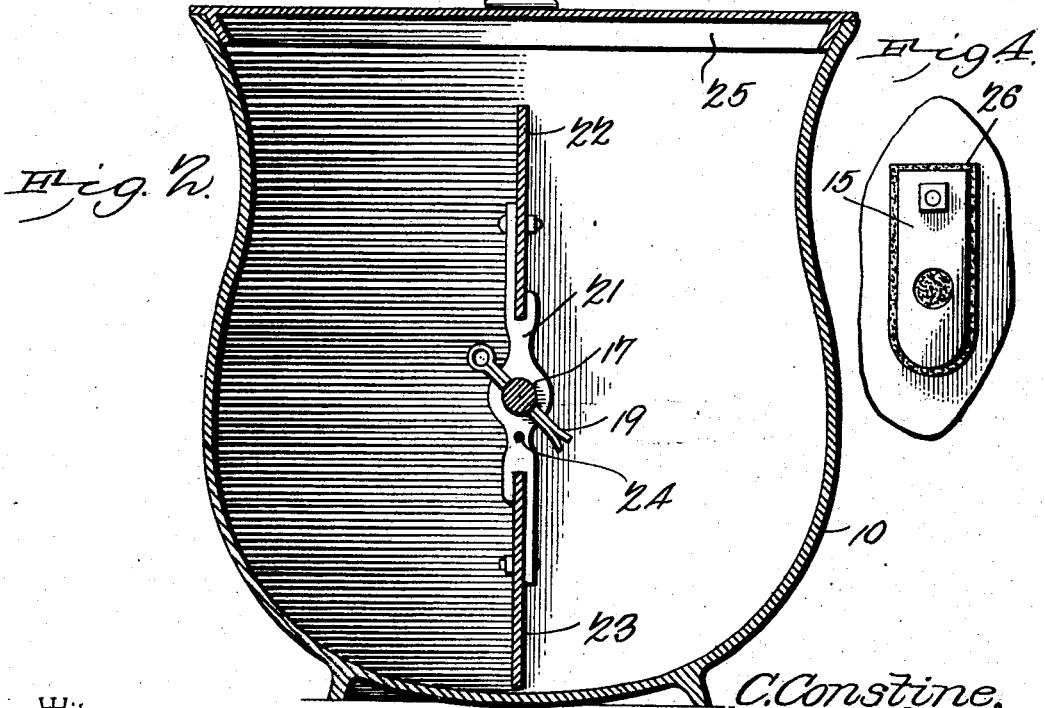
Witnesses
E. H. Stewart
C. N. Woodward
C. Constine,
Inventor.
by C. A. Snow & Co
Attorneys No. 742,168. Patented October 27, 1903.

UNITED STATES PATENT OFFICE.

CONRAD CONSTINE, OF KINGSTREE, SOUTH CAROLINA.

COFFEE-ROASTER.

SPECIFICATION forming part of Letters Patent No. 742,168, dated October 27, 1903.

Application filed June 13, 1903. Serial No. 161,341. (No model.)

*To all whom it may concern:*

Be it known that I, CONRAD CONSTINE, a citizen of the United States, residing at Kingstree, in the county of Williamsburg and State of South Carolina, have invented a new and useful Coffee-Roaster, of which the following is a specification.

This invention relates to devices employed for roasting coffee and for similar purposes, and has for its object to provide a means whereby an ordinary cooking-pot may be utilized for roasting coffee and for similar purposes without destroying its usefulness for ordinary culinary purposes; and the invention consists in certain novel features of construction, as hereinafter shown and described, and specified in the claims.

In the drawings illustrative of the invention, in which corresponding parts are denoted by like designating characters, Figure 1 is a sectional side elevation. Fig. 2 is a sectional end elevation of the device. Figs. 3 and 4 are enlarged details illustrating the manner of restoring the vessel to its ordinary condition.

In the improved device herein disclosed an ordinary iron cooking-pot (represented at 10) is utilized for holding the coffee while being roasted, and the attachment is so constructed that when not required it can be quickly detached and the pot restored to its former or ordinary condition and capable of being employed for the usual culinary purposes. The pot 10 is first provided with oppositely-disposed apertures 11 12 intermediately of the sides, and over these apertures are secured, as by clamp-bolts 13 14, bearing-plates 15 16, having apertures registering with the apertures in the pot when in place, as shown. Journaled in apertures in the plates and passing entirely through the pot is a shaft 17, having an operating-handle 18 on one end and spaced perforations within the pot to receive spring-pins or "cotters" 19, as shown. Supported upon the shaft 17 is an agitator consisting of bars 20 21, having intermediate apertures and engaging the shaft and spaced apart thereon and supporting agitator-blades 22 23 upon their opposite ends and upon opposite sides of the shaft, as shown. Connecting the bars 20 21 is a longitudinal stop-bar 24, against which the free ends of the cotter-pins strike as the shaft is revolved, and thus form a coupling between the blades and shaft to cause the blades to revolve with the shaft. The pot 10 is provided with the usual sheet-metal cover 25, as shown. By this simple means a complete and efficient coffee-roasting device is produced which may be employed on any stove or other means for providing the necessary heat or used out of doors over a camp-fire or the like.

When not required as a coffee-roaster, the cotter-pins can be removed, the shaft withdrawn, and the agitator removed and small plates of non-combustible flexible material 26, such as asbestos, inserted between the plates 15 16 and pot 10 and the bolts 13 14 set up, which will form liquid and fire proof closures to the apertures 11 12 and restore the pot for its ordinary culinary uses. Thus an ordinary cooking-pot such as is in common use for culinary purposes may be utilized for roasting coffee and for similar purposes and when not required for that purpose can be restored for its usual purposes.

The device may be adapted to any of the various sizes and forms of cooking-pots, the only change required being to change the form of the "paddles" 22 23 to adapt them to the contour of the pot.

Having thus described the invention, what I claim is—

1. In a device of the character described, a vessel having oppositely-disposed apertures, plates having apertures registering with the apertures in said vessel and adapted for attachment thereto, and a shaft journaled in said plates and extending through said vessel and provided with agitator-blades operative within the vessel, substantially as specified.

2. In a device of the character described, a vessel having oppositely-disposed apertures, plates having apertures registering with the apertures in said vessel and adapted for attachment thereto, a shaft adapted to be detachably journaled in said apertured plates and carrying agitator-blades operative within the vessel, and filling-plates adapted for insertion between said plates and vessel when the shaft is removed, substantially as specified.

3. In a device of the character described, a vessel having oppositely-disposed apertures, a shaft journaled in said vessel-apertures and provided with spaced transverse apertures, and an agitator formed of perforated spaced bars engaging said shaft within said vessel, and stop-pins detachably engaging said perforations, substantially as specified.

4. In a device of the character described, plates having apertures and adapted to be attached to the opposite sides of a cooking vessel, a shaft mounted for rotation in said plates and extending through said vessel, and agitator-blades connected to said shaft and partaking of its motion within said vessel, substantially as specified.

In testimony that I claim the foregoing as my own I have hereto affixed my signature in the presence of two witnesses.

C. CONSTINE.

Witnesses:
H. O. BRITTON,
M. S. WHITEHEAD.